Dec. 10, 1940.   H. M. ELSEY   2,224,724

CARBON BRUSH AND METHOD OF MAKING

Filed Feb. 17, 1938

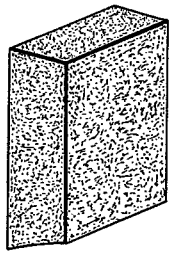

Fig.1. Impregnated with a thermosetting and volatile-free condensation product of formaldehyde and phenol.

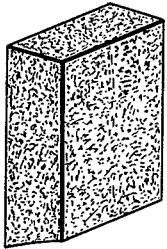

Fig.2. Carbon brush carrying a polymerized casting resin modified with oititica or tung oil.

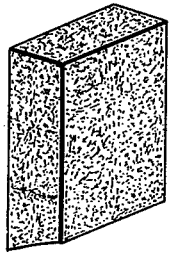

Fig.3. Carbon brush carrying a polymerized casting resin and a polymerized glycero-phthlate resin.

WITNESSES:

INVENTOR
Howard M. Elsey.
BY
Cyrus W. Savage
ATTORNEY

Patented Dec. 10, 1940

2,224,724

UNITED STATES PATENT OFFICE 2,224,724

CARBON BRUSH AND METHOD OF MAKING

Howard M. Elsey, Oakmont, Pa., assignor to Westinghouse Electric & Manufacturing Company, East Pittsburgh, Pa., a corporation of Pennsylvania Application February 17, 1938, Serial No. 191,039

4 Claims. (Cl. 171—325)

This invention relates to carbon brushes and particularly to the making and treating of carbon brushes.

In the electrical industry, carbon brushes compounded under heat and pressure are employed as contact brushes for use with commutators. These electrical contact elements or carbon brushes are generally compounded by mixing finely divided solid forms of carbon with a liquid binder and subjecting the mixture to heat and pressure to compact the material. The molded plates are then heat-treated to decompose the carbon compounds and convert the carbon residue into a strong graphitized block having good commutating properties.

Attempts have been made to strengthen the contact elements thus formed by impregnating the block or brush with different resins which polymerize when subjected to sufficient heat. Resins which have been employed for this purpose are glycero-phthalate, the vinyl resins, cellulose esters and phenolic condensation resins and the like. The resins identified hereinbefore, with the exception of the phenolic condensation resins, are, however, thermoplastic and subject to flow at elevated temperatures. For this reason, when the brush impregnated with the thermoplastic resins is heated during operation, it is found that the impregnated brushes are unsatisfactory because of the flow of the resin. Each of the listed resins are employed in solution with a solvent with the result that it is necessary to drive off the gases of the solvent from the brush while effecting the polymerization of the resin. Because of the evolution of the solvent from the brush when heat is applied to polymerize the resin, the brush sometimes explodes and pieces are blown out of the faces or surfaces of the brush.

Further, by employing these resins, it has been found possible to impregnate the brush with only from about 5 to 7% of the resin by weight of the brush, which although somewhat strengthening the brush, does not give a brush having the desired high strength.

An object of this invention is to provide for increasing the strength and durability of carbon brushes.

Another object of this invention is to provide a process for increasing the resin contact of impregnated carbon brushes.

A further object of this invention is to provide for increasing the strength and durability of a carbon brush by introducing a resin into the brush which will polymerize without damage to the brush.

A more specific object of this invention is to provide for introducing a thermosetting and volatile-free resin into the brush which when polymerized produces a very dense hard brush having a long life.

Other objects of this invention will become apparent from the following description when taken in conjunction with the accompanying drawing, in which:

Figure 1 is a perspective view of a dynamo brush impregnated with a casting resin in accordance with this invention, Fig. 2 is a perspective view of a dynamo brush carrying a modified casting resin in accordance with this invention, and Fig. 3 is a perspective view of a dynamo brush constructed in accordance with a particular embodiment of this invention.

In making the carbon brushes, the finely divided solid carbon, such as lampblack, petroleum coke, pitch coke, natural or artificial graphite or the like, is intimately mixed with a liquid binder such as coal tar, pitch, tar or the like and molded directly into the shape of an electric contact element such as a brush, or into a block which may later be machined into the shape of an electric contact element. In the molded form, the material is baked at a temperature sufficient to effect the coking or carbonization of the binder material.

Since the blocks or brushes thus formed are porous because of the coking or carbonization of the binder, it is desired to impregnate the porous structure with a material which will strengthen the carbon structure. In accordance with this invention, the porous carbon block structure is impregnated with a casting resin of the Bakelite type as illustrated in Fig. 1 of the drawing. The casting resin is a thermosetting volatile-free condensation product of formaldehyde and phenol which when subjected to sufficient heat will polymerize to an infusible solid resin without the necessity of first removing volatiles, such as water and solvents. When polymerized, the casting resin consisting of the condensation product of formaldehyde and phenol is not subject to flow when exposed to elevated temperatures. Since the casting resin is free from volatiles, it will not give off gases when subjected to the heat necessary to polymerize it and consequently explosions of the carbon structure of the brush will not be encountered.

In order to satisfactorily impregnate the carbon brush with the casting resin, the brush is inserted into a suitable closed chamber and subjected to a vacuum for a period of time of about 15 minutes to remove moisture and occluded gases from the porous carbon structure. After the brush is vacuum treated, the casting resin, identified hereinbefore, is admitted to the chamber, and where desired a pressure such as 60 cm. of mercury may be applied thereto for a period of about 15 minutes for insuring a substantially complete impregnation of the porous carbon structure.

After the brushes are substantially completely impregnated, they are removed from the impregnant and subjected to sufficient heat to effect polymerization of the resin. In practice, temperatures ranging from between 140° C. and 315° C. are satisfactory for effecting the polymerization of the casting resin. It is desired, however, that the polymerization temperature be maintained below 315° C., since experiments have proved that higher temperatures weaken the resinous bond of the carbon structure. The casting resin may be thoroughly and satisfactorily cured by heat treating the impregnated brush at temperatures of about 150° C.

By impregnating the brush as described hereinbefore, it is found that from 12 to 14% of resin by weight of the carbon brush is introduced into the brush effecting a strong bond of the carbon particles and giving a brush having a long life. Brushes impregnated with the casting resin in accordance with this invention have been found to have a contact drop of about 2.6 volts with a roughness factor ranging between about .09 and .13 volt and a commutator number ranging from about 2.3 to 3.0. The impregnation is approximately twice as large as is obtained by the known methods. Because of the high degree of impregnation obtained through the use of this particular resin, very dense and hard brushes are obtained.

Although 12 to 14% impregnation is secured by the single treatment, the impregnated brush may be again subjected to the impregnation treatment with the casting resin in order to increase the quantity of the impregnant in the brush. In subjecting the brush to the second impregnation treatment, a different resin other than the casting resin employed in the first impregnation may be employed in order to secure different characteristics in the brush. As an example, the second impregnation may be carried out under the same conditions utilized in the first impregnation with a glycero-phthalate resin in order to secure a somewhat smoother operation of the brush impregnated with the casting resin. Although the glycero-phthalate resins are not always satisfactory for the first impregnation because of the evolution of the solvent, it is found that where the glycero-phthalate resin is employed for the second impregnation, the evolution of the solvent from the glycero-phthalate will not cause the brush to explode. This is thought to be because the casting resin of the first impregnation so securely binds the carbon particles as to withstand the effects of the evolution of the solvent from the small amount of resin which enters the brush during the second impregnation. Fig. 3 illustrates a dynamo brush constructed in accordance with this embodiment of my invention.

In a further embodiment of this invention illustrated in Fig. 2, the characteristics secured in the brush may be somewhat modified by employing a fluid casting resin consisting of the condensation product of formaldehyde and phenol which has been modified with an oil selected from the group consisting of oititica oil and tung oil. Where oititica oil or tung oil is employed, it is found that the oil retards the streamer formation of sparks which are sometimes encountered at the brushes under heavy overload tests.

Although this invention has been described with reference to particular embodiments thereof, it is, of course, not to be limited thereto except insofar as is necessitated by the prior art and the scope of the appended claims.

I claim as my invention:

1. The method of treating carbon brushes of the type in which carbon particles are held together by a carbonized binder which comprises, impregnating a brush with a casting resin, the casting resin consisting of a thermosetting and volatile-free condensation product of formaldehyde and phenol, heating the brush to polymerize the casting resin, impregnating the brush containing the polymerized casting resin with a solution of glycero-phthalate resin, and heating the brush to polymerize the glycero-phthalate resin.

2. An electrical contact element comprising a porous block composed of finely divided material consisting mainly of carbon held together by a carbonized binder, and a polymerized casting resin carried in at least a portion of the pores of the block, the casting resin consisting of a thermosetting and volatile-free condensation product of formaldehyde and phenol.

3. An electrical contact element comprising a porous block composed of finely divided material consisting mainly of carbon held together by a carbonized binder, and a polymerized casting resin which has been modified with an oil selected from the group consisting of oititica and tung oil carried in at least a portion of the pores of the block, the casting resin consisting of a thermosetting and volatile-free condensation product of formaldehyde and phenol.

4. An electrical contact element comprising a porous block composed of finely divided material consisting mainly of carbon held together by a carbonized binder, and a polymerized casting resin and a polymerized glycero-phthalate resin carried in at least a portion of the pores of the block, the casting resin consisting of a thermosetting and volatile-free condensation product of formaldehyde and phenol.

HOWARD M. ELSEY.